United States Patent [19]

Calder

[11] 4,079,883

[45] Mar. 21, 1978

[54] CREDIT CARD IDENTIFYING DEVICE

[75] Inventor: William M. Calder, Toronto, Canada

[73] Assignee: The Raymond Lee Organization, Inc., New York, N.Y. ; a part interest

[21] Appl. No.: 703,778

[22] Filed: Jul. 9, 1976

[51] Int. Cl.² .................. G06K 19/06; G09F 3/02
[52] U.S. Cl. ................................. 235/441; 40/2.2
[58] Field of Search ........... 235/61.12 R, 61.12 N, 235/61.12 C, 61.11 E, 61.11 D, 61.11 A, 61.11 B; 40/2.2; 340/149 A; 200/46; 194/4 R; 101/369

[56] References Cited

U.S. PATENT DOCUMENTS

| | | | |
|---|---|---|---|
| 3,399,473 | 9/1968 | Jaffe | 40/2.2 |
| 3,505,954 | 4/1970 | Projansky | 101/369 |
| 3,624,938 | 12/1971 | Richard | 235/61.12 N |
| 3,876,865 | 4/1975 | Bliss | 235/61.11 A |

Primary Examiner—Robert M. Kilgore
Attorney, Agent, or Firm—Daniel Jay Tick

[57] ABSTRACT

A credit card of electrically insulative material has electrically conductive material embedded therein. The electrically conductive material has the configuration of an irregular line extending between a pair of spaced bores in the area of an edge of the card and a plurality of spot openings in the line formed in a predetermined pattern. The credit card has openings at a surface thereof in the area of the spot openings. Each of a pair of electrically conductive annular contact members is mounted in a corresponding one of the bores in electrical contact with the electrically conductive material. A key member has a plate-like configuration of electrically insulative material having electrically conductive material spots protruding from a surface thereof in the predetermined pattern whereby when the card and the key member are juxtaposed the spots of the key member fill the spot openings of the card and close a circuit between the contact members. An electrical energizing and signalling device supplies electrical energy to the contact members and signals when the circuit between the contact members is closed.

1 Claim, 5 Drawing Figures

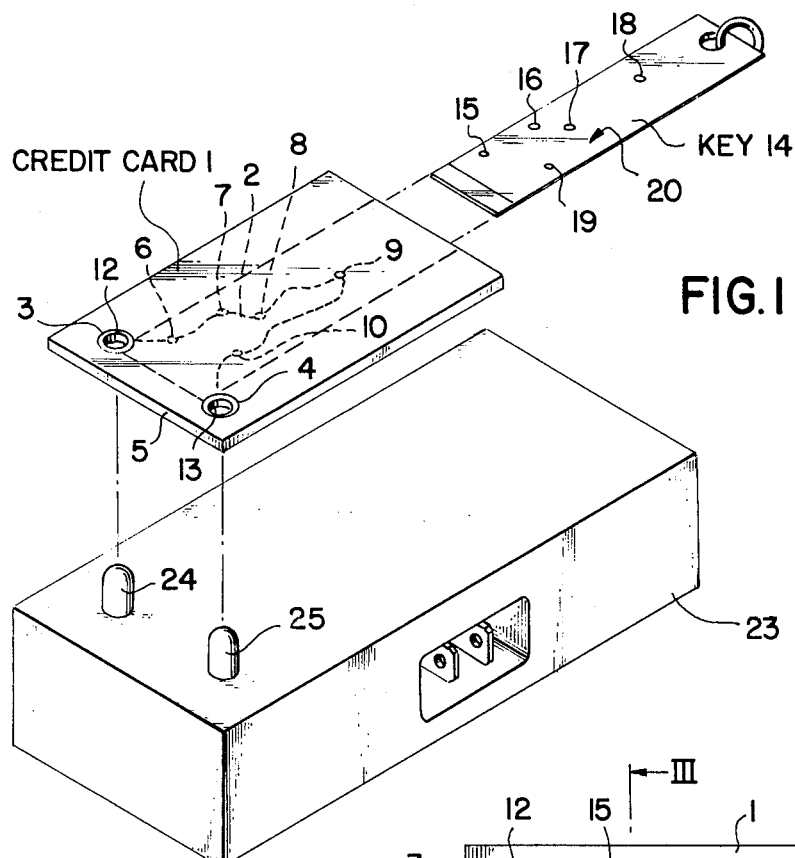
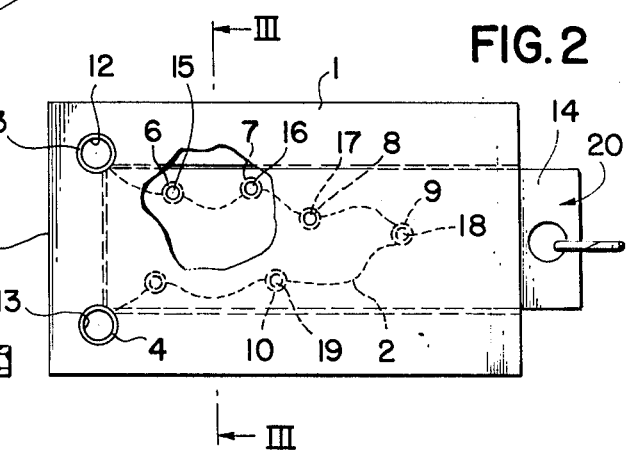
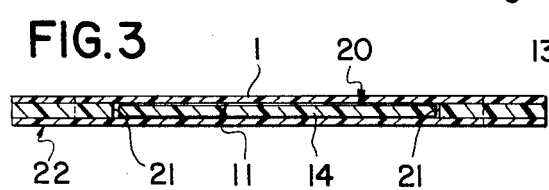
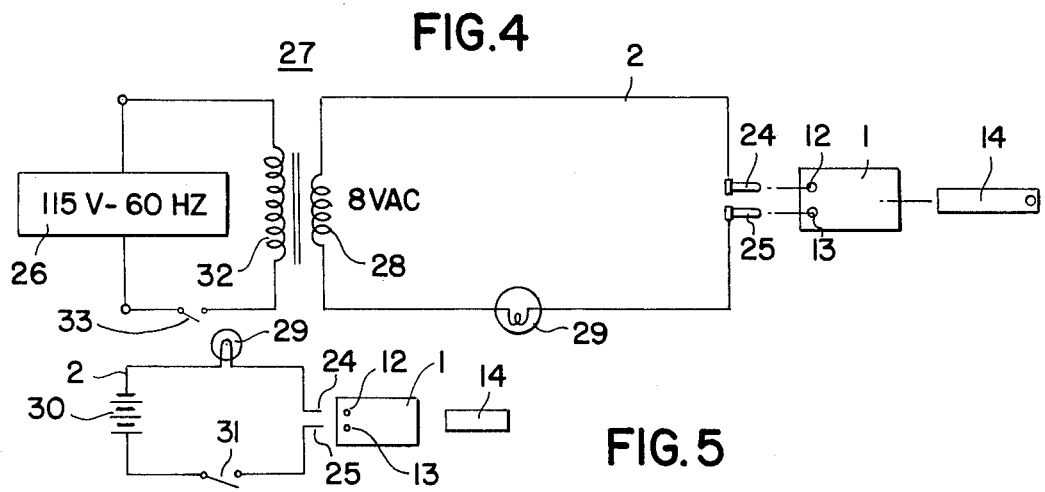

CREDIT CARD IDENTIFYING DEVICE

BACKGROUND OF THE INVENTION

The present invention relates to a credit card identifying device. More particularly, the invention relates to a credit card device for authenticating a credit card.

Objects of the invention are to provide a credit card identifying device of simple structure, which is inexpensive in manufacture, used with facility, convenience and rapidity, and functions efficiently, effectively and reliably to insure, to a great extent, that only a proper person is credited with the use of a credit card.

BRIEF DESCRIPTION OF THE DRAWINGS

In order that the invention may be readily carried into effect, it will now be described with reference to the accompanying drawing, wherein:

FIG. 1 is an exploded perspective view of an embodiment of the credit card identifying device of the invention;

FIG. 2 is a view of the credit card and key of the credit card identifying device of the invention as they are used;

FIG. 3 is a cross-sectional view, taken along the lines III—III, of FIG. 2;

FIG. 4 is a circuit diagram of the embodiment of the credit card identifying device of the invention; and FIG. 5 is a circuit diagram of a modification of the credit card identifying device of FIG. 4.

DETAILED DESCRIPTION OF THE INVENTION:

The credit card identifying device of the invention is for authenticating a credit card.

The credit card identifying device of the invention comprises a credit card 1 of electrically insulative material, such as, for example, plastic, having electrically conductive material 2 (FIGS. 1, 2, 4 and 5) such as, for example, copper wire embedded therein. The electrically conductive material 2 has the configuration of an irregular line, as shown in FIGS. 1 and 2, extending between a pair of spaced bores 3 and 4 (FIGS. 1 and 2) in the area of an edge 5 of the credit card 1. A plurality of spot openings 6, 7, 8, 9 and 10 (FIGS. 1 and 2) are provided in the line 2 formed in a predetermined pattern. The credit card 1 has openings at the surface 11 thereof (FIG. 3) in the area of the spot openings 6 to 10.

A pair of electrically conductive annular contact members 12 and 13 are provided (FIGS. 1, 2, 4 and 5). The annular contact member 12 is mounted in the bore 3 in electrical contact with the electrically conductive material 2 and the annular contact member 13 is mounted in the bore 4 in electrical contact with said electrically conductive material.

A key 14 (FIGS. 1 to 5) has a substantially plate-like configuration of electrically insulative material of any suitable type such as, for example, plastic. The key 14 has a plurality of electrically conductive material spots 15, 16, 17, 18 and 19 (FIGS. 1 and 2), of any suitable type such as, for example, copper, protruding from a surface 20 thereof (FIGS. 1 to 3). The electrically conductive material spots 15 to 20 of the key 14 protrude from the surface 20 of said key in a predetermined pattern whereby when the credit card 1 and said key are juxtaposed, the spots of said key fill the spot openings 6 to 10, respectively, of said card and close a circuit between the contact members 12 and 13.

In other words, the credit card 1 has a circuit embedded therein with gaps in the circuit formed in a predetermined pattern and the key has the same pattern of electrically conductive spots for filling the gaps of the card and providing a complete circuit in said card.

As shown in FIG. 3, the credit card 1 has a channel 21 formed therein and the key 14 is accommodated in said channel and forms a coplanar surface with the surface 22 of said credit card having the channel formed therein.

An electrical energizing and signalling device 23 (FIG. 1) supplies electrical energy to the contact members 12 and 13 via a pair of electrical contact prongs 24 and 25 and signals when the circuit between said contact members is closed. FIG. 4 illustrates an electrical energizing and signal device utilizing commercially available electrical energy and FIG. 5 illustrates such a device utilizing a battery.

In FIG. 4, commercially available alternating current 26 of 115 volts at 60 Hertz is stepped down to a suitably low voltage via a transformer 27. The secondary winding 28 of the transformer is connected in series circuit arrangement with prongs 24 and 25 and a signal lamp 29. Thus, when the key 14 and the card 1 are juxtaposed and are the proper combination, and electrical energy is supplied via the prongs 24 and 25, the signal lamp 29 is energized and indicates authentication of the card.

In the embodiment of FIG. 5 the signal lamp 29 and prongs 24 and 25 are connected in series circuit arrangement with a battery 30 of any suitable type, which may be rechargeable, and a switch 31.

In the embodiment of FIG. 4 the primary winding 32 of the transformer 27 is energized via a switch 33.

While the invention has been described by means of a specific example and in a specific embodiment, I do not wish to be limited thereto, for obvious modifications will occur to those skilled in the art without departing from the spirit and scope of the invention.

I claim:

1. A credit card identifying device for authenticating a credit card, said credit card identifying device comprising
    a credit card of electrically insulative material having electrically conductive material embedded therein, said electrically conductive material having the configuration of an irregular line extending between a pair of spaced bores in the area of an edge of the card and a plurality of spot openings in said line formed in a predetermined pattern, said credit card having openings at a surface thereof in the area of said spot openings, said credit card having a channel formed therein;
    a pair of electrically conductive annular contact members each mounted in a corresponding one of said bores in electrical contact with said electrically conductive material;
    key means having a substantially plate-like configuration of electrically insulative material having electrically conductive material spots protruding from a surface thereof in said predetermined pattern, said key means being accommodated in said channel, whereby when said credit card and said key means are juxtaposed with said key means in said channel the spots of said key means fill the spot openings of said card and close a circuit between the contact members, said key means forming a coplanar surface with the surface of said credit card having the channel formed therein; and
    electrical energizing and signalling means for supplying electrical energy to said contact members and for signalling when the circuit between said contact members is closed.

* * * * *